United States Patent [19]

Brehob

[11] 4,154,207
[45] May 15, 1979

[54] PISTON AND RING FOR REDUCING HC EMISSIONS

[75] Inventor: Wayne M. Brehob, Dearborn, Mich.

[73] Assignee: Ford Motor Company, Dearborn, Mich.

[21] Appl. No.: 813,714

[22] Filed: Jul. 7, 1977

[51] Int. Cl.² .......................... F02F 3/28; F02F 5/00
[52] U.S. Cl. ........................ 123/193 P; 123/47 R; 92/183; 92/185; 277/29; 277/73
[58] Field of Search .......... 123/47 R, 193 R, 193 CP, 123/193 P; 92/182, 183, 185; 277/29, 73, 79

[56] References Cited

U.S. PATENT DOCUMENTS

| 1,778,200 | 10/1930 | Nibbs | 277/29 |
| 2,064,969 | 12/1936 | Carr et al. | 277/29 |
| 2,459,447 | 1/1949 | Milliken | 123/193 R |
| 2,557,039 | 6/1951 | Stewart | 277/73 |
| 2,653,065 | 9/1953 | Appleton | 123/193 R |
| 2,774,619 | 12/1956 | Mercier | 92/183 |

FOREIGN PATENT DOCUMENTS 1061274 7/1959 Fed. Rep. of Germany ............ 277/73

OTHER PUBLICATIONS

Quillian et al., "Crankcase-Diversion Tactics," SAE Journal, May, 1964, pp. 50-56.

Primary Examiner—Charles J. Myhre
Assistant Examiner—Craig R. Feinberg
Attorney, Agent, or Firm—Robert E. McCollum; Keith L. Zerschling

[57] ABSTRACT

An internal combustion engine is provided with pistons having openings connecting the space behind one of the piston rings with the crankcase during certain portions of the operating cycle of the engine. This is accomplished by the use of a differential pressure control valve that vents the unburned hydrocarbons trapped behind the compression ring to the crankcase during periods when the pressure in the combustion chamber is at the lower values during the internal combustion engine operating cycle. These unburned hydrocarbons are, therefore, directed into the crankcase of the engine rather than being permitted to leak back into the combustion chamber and to be discharged into the atmosphere during the exhaust stroke of the engine.

8 Claims, 2 Drawing Figures

PISTON AND RING FOR REDUCING HC EMISSIONS

BACKGROUND OF THE INVENTION

This invention relates to piston type four cycle internal combustion engines and more particularly to a means for venting the clearance space behind at least the top compression piston ring to the crankcase of the engine during certain portions of the engine operating cycle thereby reducing hydrocarbon emissions from such engine.

U.S. Pat. No. 3,335,643, issued Aug. 15, 1967 to J. T. Wentworth discloses a method and means for reducing these unburned hydrocarbon emissions by the use of a ring design that seals the sides of the top compression ring and further provides a chamfer at the edge of the piston crown. Passages in this construction connect the crown of the piston with the ring back clearance to equalize pressures on the ring. This design, however, employs elastomeric or rubber sealing elements positioned on the top and bottom of the piston ring and there is some question whether this type of arrangement, and particularly the use of the elastomeric sealing members, would be feasible for large scale mass production engines that are used in the automobile industry.

U.S. Pat. No. 3,667,443 issued June 6, 1972 to Currie et al discloses an internal combustion engine that is provided with pistons having vent openings connecting the space between the first and second piston rings with the engine crankcase so as to vent to the crankcase gases rich in unburned hydrocarbons which escape from the combustion chamber past the first piston ring. It is stated in that patent that this method of venting the clearance space has been shown to reduce hydrocarbon emissions in some instances. It is stated in the patent, however, that the vent openings could be fitted with one-way valves.

SUMMARY OF THE INVENTION

This invention provides a means that may be capable of reducing unburned hydrocarbon emissions in the exhaust gases of an internal combustion engine by the use of a differential pressure control valve that vents unburned hydrocarbon from behind the top compression ring of the pistons to the engine crankcase. In the preferred form of the invention, this differential pressure control valve is a small spool valve that is subjected on one side to the pressure of the gases in the combustion space above the piston and on the other side to the pressure of the gases behind the top compression ring. When the pressure in the combustion chamber is increasing during the compression and combustion strokes of the internal combustion engine, the spool valve is forced into a position in which it cuts off communication between the crankcase and the space behind the top compression ring of the piston. Consequently, normal pressure can develop behind this piston ring so that it operates in the normal way to provide a seal between the piston ring and the cylinder wall.

On the other hand, when the pressure of the gases in the combustion space is decreasing as occurs during the exhaust and intake strokes of the piston, the spool valve moves into a position, due to this decreasing pressure, that connects the space behind the top piston ring to the crankcase. This is accomplished because the small ring clearance delays the pressure change on the side of the spool valve exposed to the space behind the piston ring while the other side of the valve is exposed to the full rate of pressure drop in the combustion space. The gases behind the top compression piston ring are thus vented into the crankcase where they may be recirculated through the engine by the use of the universally employed positive crankcase ventilation system.

The overall result of the above-described operation is that during increasing pressures in the combustion chamber, pressure can build up behind the piston ring so that it performs the required sealing function of the ring, but when the pressure drops in the combustion space and venting of the unburned hydrocarbons behind the ring to the combustion space would normally occur, these unburned hydrocarbons are vented to the crankcase where they may be recirculated through the engine to be properly burned.

DESCRIPTION OF THE PREFERRED EMBODIMENT

Figure 1:
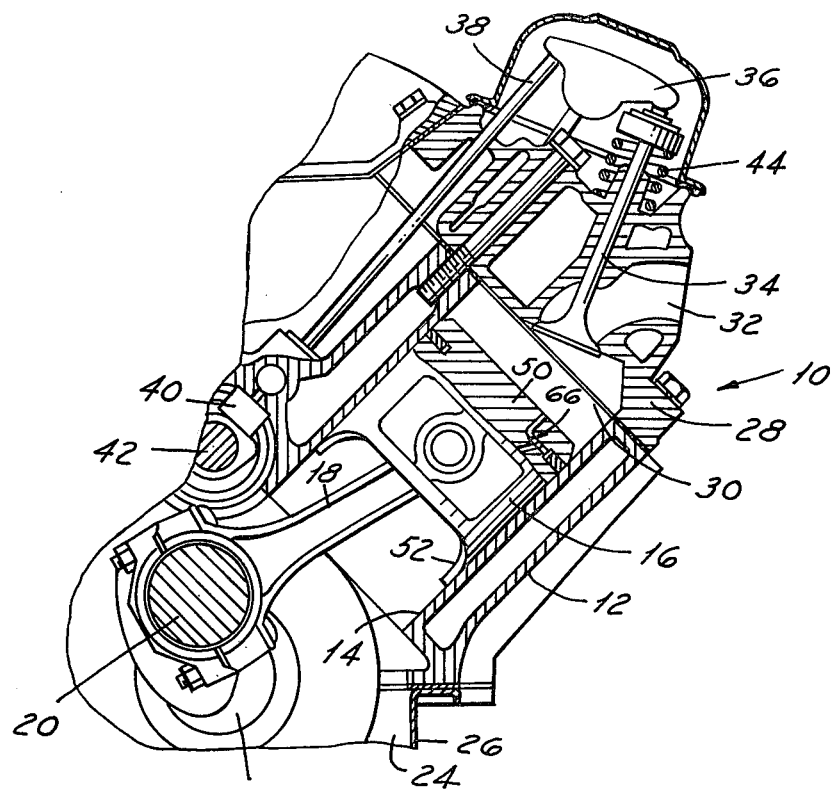
FIG. 1 is a partial cross sectional view of a four stroke internal combustion engine including the construction of this invention.

Referring now to the drawings in which like reference numerals designate like parts throughout the various views thereof, there is shown in FIG. 1 an internal combustion engine generally designated by the numeral 10. This engine is a four stroke gasoline internal combustion engine of the conventional V-type which is commonly used in the automotive industry. It is to be understood, however, that the invention can be used with any four stroke internal combustion engine of the piston type.

The engine 10 includes a cylinder block 12 having a plurality of cylinders positioned therein, one of which is shown in the drawings and is designated by the numeral 14. A piston 16 is positioned in each of the cylinders and is connected by connecting rod 18 with a portion 20 of a crankshaft 22. This crankshaft 22 is rotatably supported by the cylinder block 12 and is enclosed within the engine crankcase 24 by means of the cylinder block 12 and the oil pan 26. The engine crankcase is thus connected to the lower end portions of the cylinders 14 and to the lower end portions of the piston 16.

The upper ends of the cylinders 14 are covered by a cylinder head 28 which forms with the cylinders 14 and the piston 16 a combustion chamber or space 30 over each of the pistons 16. The cylinder head 28 includes usual intake ports and valves, not shown, as well as exhaust ports 32 and exhaust valves 34 to provide for the admission of a fuel-air mixture to the combustion chambers or spaces 30 and the discharge of exhaust products from the combustion chambers or spaces 30. The exhause valves 34 and the intake valves, which are not shown, are actuated by means of a conventional valve gear that includes rocker arms 36, push rods 38 and hydraulic lifters 40. The valve gear is driven by a cam shaft 42 carried in the cylinder block 12. Conventional coil springs 44 are employed to seat the valves in their valve seats.

Each piston 16 includes a crown portion 50 and a skirt portion 52 that are joined integrally by a ring belt portion 54. The ring belt portion 54 has a plurality of peripheral and axially spaced piston ring grooves 56 and 58 positioned therein. First and second compression piston rings 60 and 62 are positioned in the peripheral grooves 56 and 58, respectively.

The space 64 positioned radially inwardly of the first compression piston ring 60 is connected to the combustion chamber or space 30 above the crown 50 of the piston 16 via an internal passage or conduit generally designated by the numeral 66. This internal passage or conduit 66 includes a first radially inwardly extending portion 68 and a second portion 70 which extends essentially at right angles to the first portion 68. The first portion 68 has a threaded sleeve 72 positioned therein which has an internal bore 74. This first radially inwardly extending portion 68 also has a passageway or conduit 76 that connects the first radially inwardly extending portion 68 with the internal portion of the piston 16 and hence to the engine crankcase 24.

A spool valve 78 is positioned within the first radially inwardly extending portion 68 of the passageway or conduit 66 and it is adapted to move radially inwardly and outwardly in the first portion 68 to alternately and cyclically cover and uncover the conduit or passage 76 and hence to alternately and cyclically open and close communication between the first radially inwardly extending portion 68 of the passage 66 and the crankcase 24. The sleeve 72 provides an abutment or stop for movement of the spool valve 78 radially outwardly of the piston 16, or to the right as shown in FIG. 2, and a shoulder 80 is provided in the first portion 68 of the passage or conduit 66 to limit movement of the spool valve 78 radially inwardly with respect to the piston 66, or to the left as shown in FIG. 2.

Figure 2:
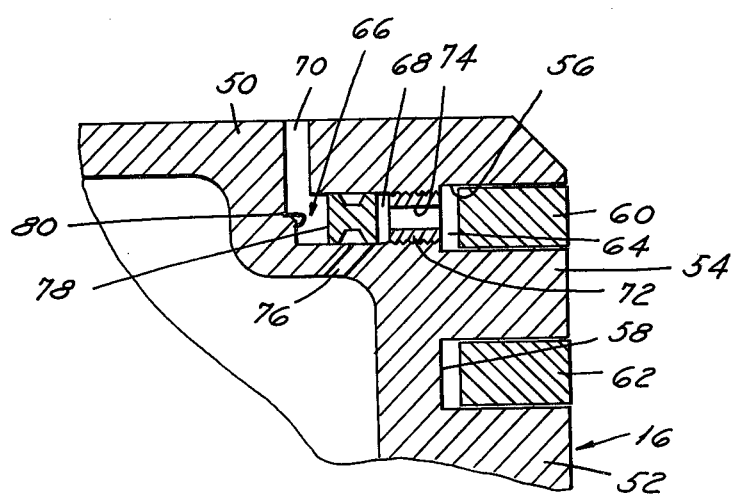
FIG. 2 is an enlarged partial sectional view of the piston of an internal combustion engine utilizing the invention.

When the pressure in the combustion chamber or space 30 is increasing during the compression and combustion strokes of the engine 10, the spool valve 78 is forced to the right as shown in FIG. 2 and radially outwardly with respect to the piston 16 by the pressure differential across it. The pressure on the left side of the spool valve 78 is essentially the full pressure in the combustion chamber or space 30 which is applied to it through the second portion 70 of the passageway 66. The pressure is lower on the right hand side of the spool valve 78 than the pressure on the left hand side because pressure build-up is delayed by the pressure drop through the clearances between the piston ring 60 and the groove 56 in which it is positioned. As a result, the spool valve 78 moves until it abuts the sleeve 72 and the conduit 76 which connects the passageway 66 to the crankcase 24 is blocked or sealed. Consequently, pressure can build behind the piston ring 60 in the space 64 thereby forcing the piston ring 60 radially outwardly so that it can perform its sealing function with the cylinder 14.

On the other hand, when the pressure of the gases in the combustion chamber or space 30 is decreasing during the induction and exhaust strokes of the piston 16, the gases that are normally rich in unburned hydrocarbons would normally begin to discharge from the space 64 back into the combustion space 30 through the clearances provided between the piston ring 60 and the walls of the groove 56. The spool valve 78, however, is shifted to the left or radially inwardly with respect to the piston 16 and into abutment with the shoulder 80. This occurs because of the small clearance between the piston ring 60 and the groove 56 that delays the pressure change on the right hand side of the spool valve 78. The left hand side of the spool valve 78, on the other hand, is subjected to the full rate of the drop in pressure in the combustion chamber or space 30. Consequently, the conduit 76 is uncovered and the space 64 behind or radially inwardly of the piston ring 60 is vented to the crankcase 24. The gases that are trapped behind the piston ring 60 that are high in unburned hydrocarbons, therefore, are vented to the crankcase 24. They may then be circulated back through the induction system of the engine to be burned in the combustion chambers or spaces 30 by the positive crankcase ventilation system incorporated in present-day internal combustion engines used in automotive vehicles.

The present invention thus provides a means for reducing unburned hydrocarbon emissions from a reciprocating internal combustion engine by preventing the unburned hydrocarbons trapped in a piston ring groove from re-entering the combustion chamber or space of the piston and thus be exhausted to atmosphere through the exhaust system of the engine. This is accomplished by means of a differential pressure control valve that vents these unburned hydrocarbons from behind the top compression ring of the piston to the engine crankcase during a portion of the exhaust and induction strokes of the engine when the pressures in the combustion spaces or chambers in the engine are at their lower values.

I claim:

1. In a four cycle internal combustion engine the combination comprising a crankcase, an engine block, a cylinder located in said engine block, a piston having an upper portion and a lower portion and a side wall positioned in said cylinder, a head positioned over said block and defining with the upper portion of the piston and the cylinder a combustion space adapted to receive a mixture of fuel and air therein and for exhausting products of combustion from said combustion space, the lower portion of said piston being in communication with said crankcase, an annular groove positioned in the side wall of said piston, a piston ring positioned in said annular groove, a passage means in said piston communicating with said groove and with the top of said piston and with said combustion space and with said crankcase, and movable valve means positioned in said passage means having one end subjected to the pressure in said combustion space and the other end subjected to the pressure in said groove for closing communication between said groove and said combustion space and opening communication between said groove and said crankcase during the intake and exhaust strokes of said engine.

2. The combination of claim 1 in which said passage means has a portion extending radially inwardly from said groove and a second portion extending from said first portion through the top of said piston, and said valve means comprises a spool valve located in said first portion.

3. The combination of claim 2 in which said first portion of said passage means is in communication with said crankcase and has a pair of axially spaced abutment means for engagement with the ends of said spool valve.

4. The combination of claim 3 in which one of said abutment means comprises a shoulder and the other of said abutment means comprises a threaded sleeve positioned in said first portion of said passage means.

5. In a four stroke reciprocating internal combustion engine having a crankcase, a cylinder, a piston reciprocally mounted in said cylinder, and means positioned over said cylinder to form with said cylinder and said piston a combustion space, an annular groove positioned in said piston, a piston ring positioned in said groove, and free moving fluid pressure responsive means positioned in said piston and responsive to the differential pressure of the gases in said combustion space and the pressure of the gases in said groove for movement to a position venting said groove to said crankcase during at least a portion of the induction and exhaust strokes of said engine, said pressure responsive means positioned in said piston comprising an internal passage in said piston connecting said groove with said combustion space and a spool valve positioned in said internal passage and having one side subjected to the pressure of the gases in said combustion space and the other side subjected to the pressure of the gases in said groove.

6. The combination of claim 5 in which said means positioned in said piston further comprises a second internal passage positioned in said piston connecting said first mentioned internal passage with said crankcase, said spool valve being located in said first-mentioned internal passage in a position to close the communication between said first-mentioned internal passage and said second internal passage during at least a portion of the combustion and compression strokes of said engine.

7. In a four cycle reciprocating internal combustion engine having a crankcase, a cylinder, and a piston reciprocally mounted in said cylinder, means positioned over one end of said cylinder to form with said cylinder and said piston a combustion chamber, an annular groove positioned in said piston, a piston ring positioned in said groove, and means positioned in said piston for venting said groove to said crankcase when the pressure of the gases in said combustion chamber is in the lower portion of the range of pressures occuring in said combustion chamber during engine operation and for closing communication between said groove and said crankcase when the pressure of the gases in said combustion chamber is in the upper portion of the range of pressures occurring in said combustion chamber during engine operation, said last mentioned means comprising a differential pressure valve positioned in said piston and means positioned in said piston for subjecting one side of said differential pressure valve to the pressure of the gases in said combustion chamber and the other side to the pressure of the gases in said groove.

8. The combination of claim 7 in which said piston has an opening in communication with said crankcase and said groove and said differential pressure valve covers said opening when pressure of the gases in said combustion chamber is in the upper portion of said range and uncovers said opening when the pressure of the gases in said combustion chamber is in the lower portion of said range.

* * * * *